(12) United States Patent
Tharpe

(10) Patent No.: US 10,486,292 B2
(45) Date of Patent: Nov. 26, 2019

(54) PULLER SPACER AND METHOD OF USING SAME

(71) Applicant: H and J Trucking Company, Inc., Charleston, SC (US)

(72) Inventor: David Kent Tharpe, Awendaw, SC (US)

(*) Notice: Subject to any disclaimer, the term of this patent is extended or adjusted under 35 U.S.C. 154(b) by 146 days.

(21) Appl. No.: 15/697,527

(22) Filed: Sep. 7, 2017

(65) Prior Publication Data

US 2019/0070715 A1 Mar. 7, 2019

(51) Int. Cl.
*B25B 27/02* (2006.01)
*B25B 27/00* (2006.01)
*B25B 27/06* (2006.01)

(52) U.S. Cl.
CPC ........ *B25B 27/0035* (2013.01); *B25B 27/023* (2013.01); *B25B 27/062* (2013.01)

(58) Field of Classification Search
CPC .. B25B 27/0035; B25B 27/062; B25B 27/023
See application file for complete search history.

(56) References Cited

U.S. PATENT DOCUMENTS

| 4,074,410 | A | | 2/1978 | Jarm | |
| 4,649,615 | A | | 3/1987 | Hundley | |
| 4,868,965 | A | * | 9/1989 | Drymon | B25B 27/0035 29/259 |
| 4,989,312 | A | | 2/1991 | Maddalena | |
| 5,781,978 | A | | 7/1998 | Fleming | |
| 6,314,632 | B1 | * | 11/2001 | Athan | B25B 27/023 29/256 |
| 6,343,411 | B1 | | 2/2002 | Sigman | |
| 6,990,713 | B2 | | 1/2006 | Tally et al. | |
| 7,770,277 | B2 | | 8/2010 | Wridt | |
| 8,739,377 | B2 | | 6/2014 | Shen | |
| 2016/0151867 | A1 | * | 6/2016 | Chen | B25B 27/023 29/261 |

* cited by examiner

*Primary Examiner* — Jun S Yoo
(74) *Attorney, Agent, or Firm* — B. Craig Killough; Barnwell Whaley Patterson & Helms, LLC

(57) ABSTRACT

A puller spacer has a cylindrical and elongated body. The puller spacer has a slot formed in a side of the body. The slot extends from a center bore of the puller spacer to an exterior of the puller spacer. Wires that extend out of a steering column are routed through a bottom of the puller spacer and into a center bore of the puller spacer, with an end of each of the wires extending out of the slot formed in a side of the puller spacer. The puller spacer is positioned between a distal end of a center threaded member of a steering wheel puller and the top of the steering column. The steering wheel puller engages the steering wheel and the center threaded member of the steering wheel puller is advanced to pull the steering wheel away from the steering column.

10 Claims, 7 Drawing Sheets

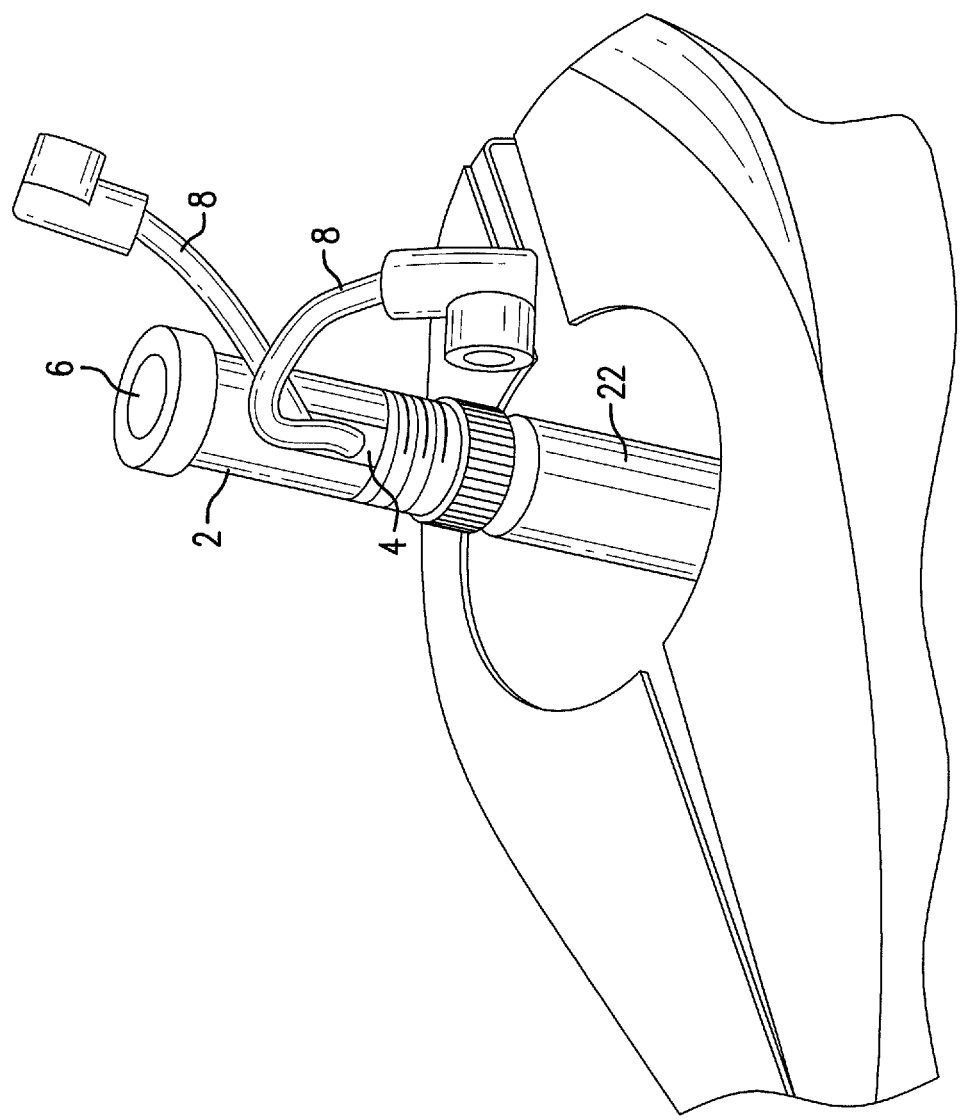

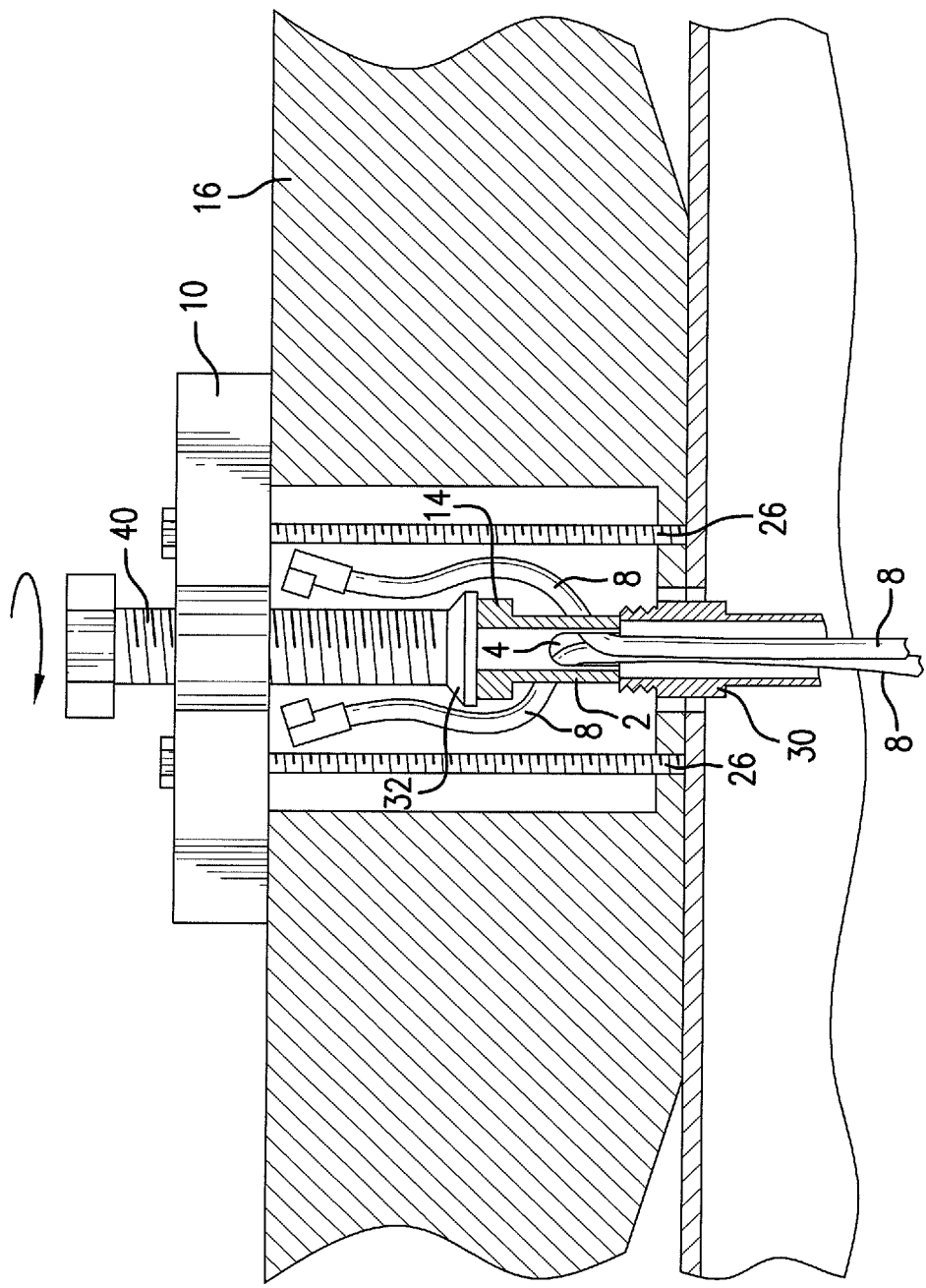

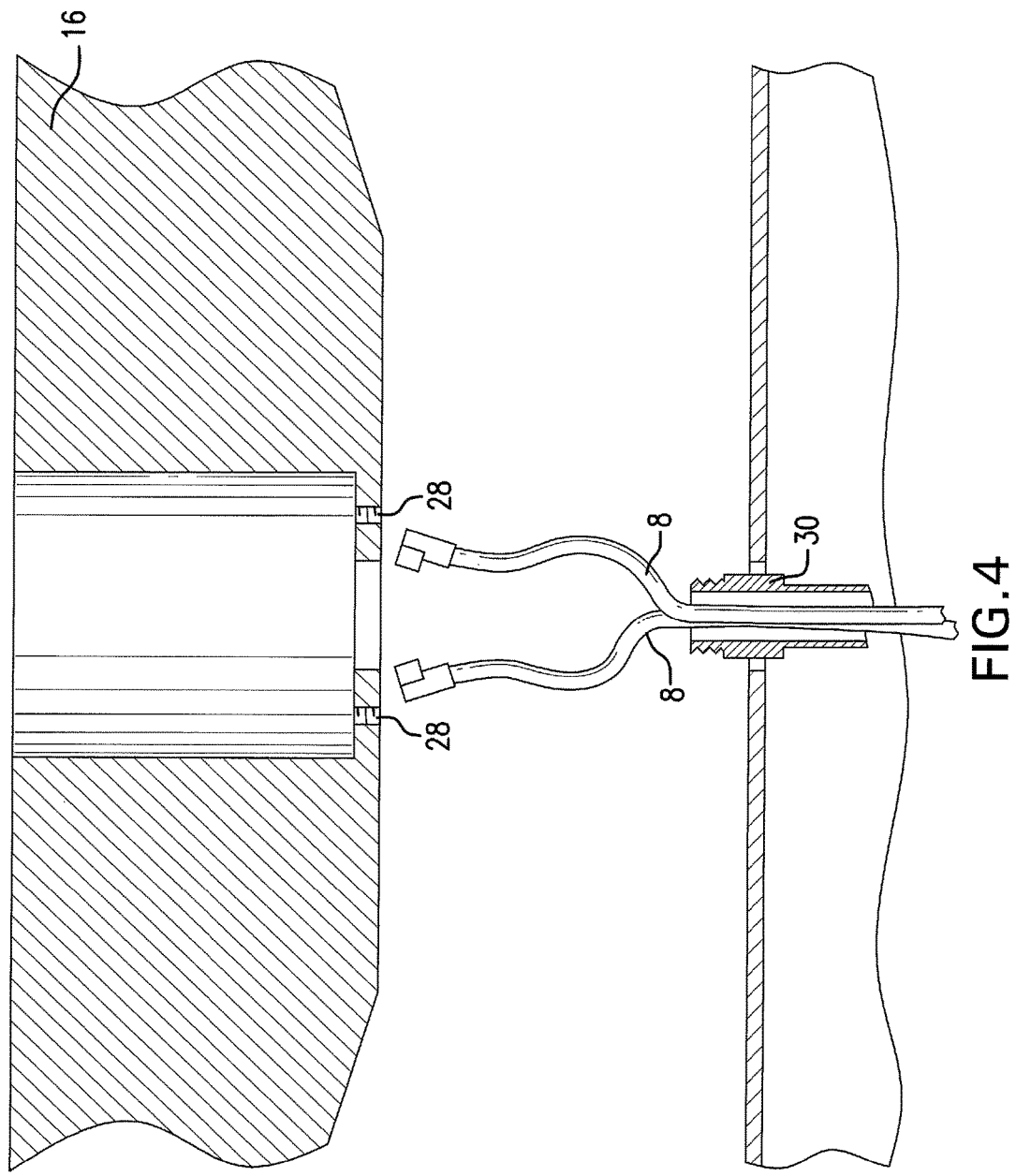

PULLER SPACER AND METHOD OF USING SAME

BACKGROUND OF THE INVENTION

It is sometimes necessary to remove steering wheels from vehicles such as large trucks to make repairs or for replacement of the steering wheel. The repair or replacement may be to the steering wheel itself, or to some apparatus associated with the steering column.

Steering wheels are mounted to steering columns by frictional fit. Pulling devices are used to pull the steering wheel away from the steering column. These devices commonly use a threaded member that is rotated to apply a force to the steering column and pull the steering wheel away from the steering column.

Steering wheels for vehicles may have switches mounted in them for actuation of the vehicle's horn. Conductor wires are associated with the horn that extends through the steering column and into the horn switch.

The threaded member that engages the steering column when pulling the steering wheel contacts the conductor wires for the horn switch. Frequently, pulling devices damage the horn wires. The wires may get tangled in the pulling device or the pulling device may cut the wires as it applies pressure to the steering column.

There is a need for a device that eliminates damage to horn wires as a steering wheel is removed from a steering column.

SUMMARY OF THE INVENTION

A puller spacer has a cylindrical and elongated body. The puller spacer has a slot formed in a side of the body. The slot extends from a center bore of the puller spacer to an exterior of the puller spacer.

A steering wheel is removed from a vehicle by positioning wires that extend out of a steering column though a bottom of the puller spacer and into a center bore of the puller spacer, with an end of each of the wires extending out of the slot formed in a side of the puller spacer. The puller spacer is positioned between a distal end of a center threaded member of a steering wheel puller and the top of the steering column. The steering wheel puller engages the steering wheel. The center threaded member of the steering wheel puller is advanced against the puller spacer and the steering column to pull the steering wheel away from the steering column.

BRIEF DRAWING DESCRIPTION

FIG. 2 is a perspective view demonstrating the puller spacer positioned with the horn wires extending through a slot in the body of the puller spacer.

FIG. 3A is a sectioned view showing a steering wheel puller mounted to a steering wheel with the puller spacer in position.

FIG. 4 is a sectioned view showing further progression as the steering wheel is separated from the steering column and the steering wheel puller and puller spacer are removed.

DESCRIPTION OF PREFERRED EMBODIMENTS

Figure 6:
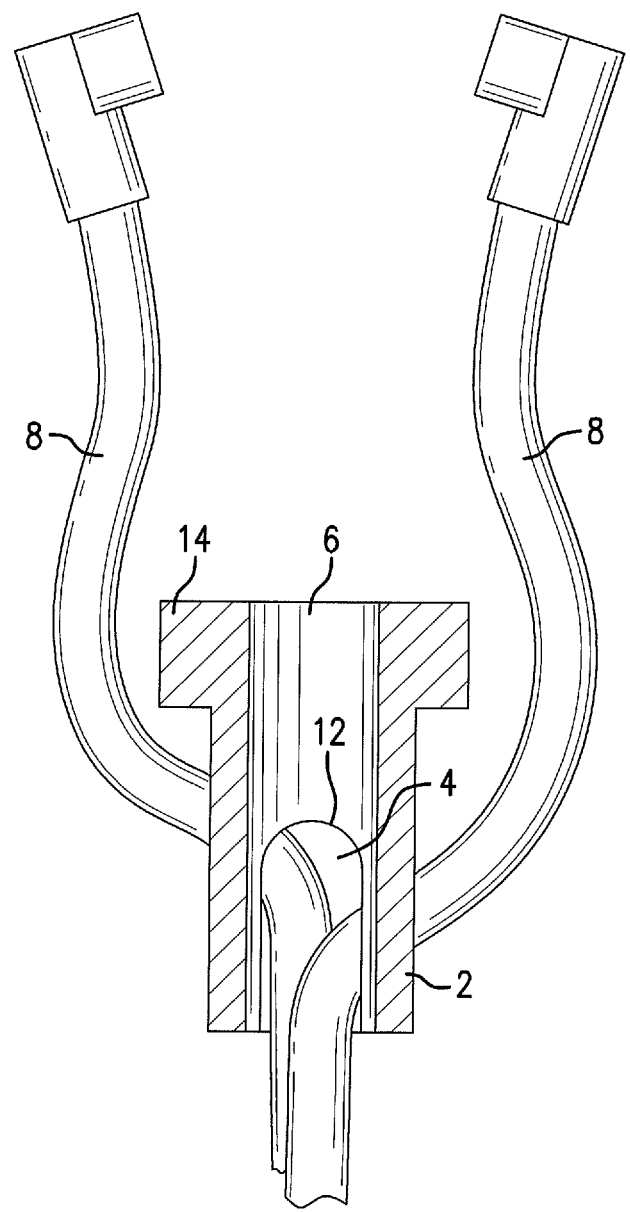
FIG. 6 is a sectioned view the puller spacer showing conductive wires extending into the center bore of the puller spacer and out of the slot in the side of the puller spacer.

As shown in FIG. 6, the puller spacer in a preferred embodiment has an elongated and cylindrical body 2. The cylindrical body has a slot 4 formed in a side thereof. The slot is preferred to extend approximately half of the length of the body, and extends through the bottom of the cylindrical body to form an opening at the bottom of the cylindrical body. The slot is preferred to have an arcuate top portion 12 having no sharp edges or corners as the top portion joins generally parallel sides, thereby reducing the likelihood of damage to conductive wires that extend through the slot. The slot is constructed to allow at least two insulated wires of 10 gauge each to pass through the slot. A center bore 6 is formed in the body of the puller spacer, which may extend from the bottom of the body to the top of the cylindrical body, opening at the top of the body and the bottom of the cylindrical body. In another embodiment, the body is not cylindrical, but the body has a slot and a center bore that opens at a top and a bottom of the body.

In one embodiment, shoulders 14 of the puller spacer are enlarged so as to extend over the body, thereby increasing a surface area for engagement with the threaded member assembly of the steering wheel puller. The shoulders extend over the entire circumference of the elongated and lower part of the body 2. The shoulders preferably have a larger diameter than the diameter of the elongated and lower part of the body.

Figure 1:
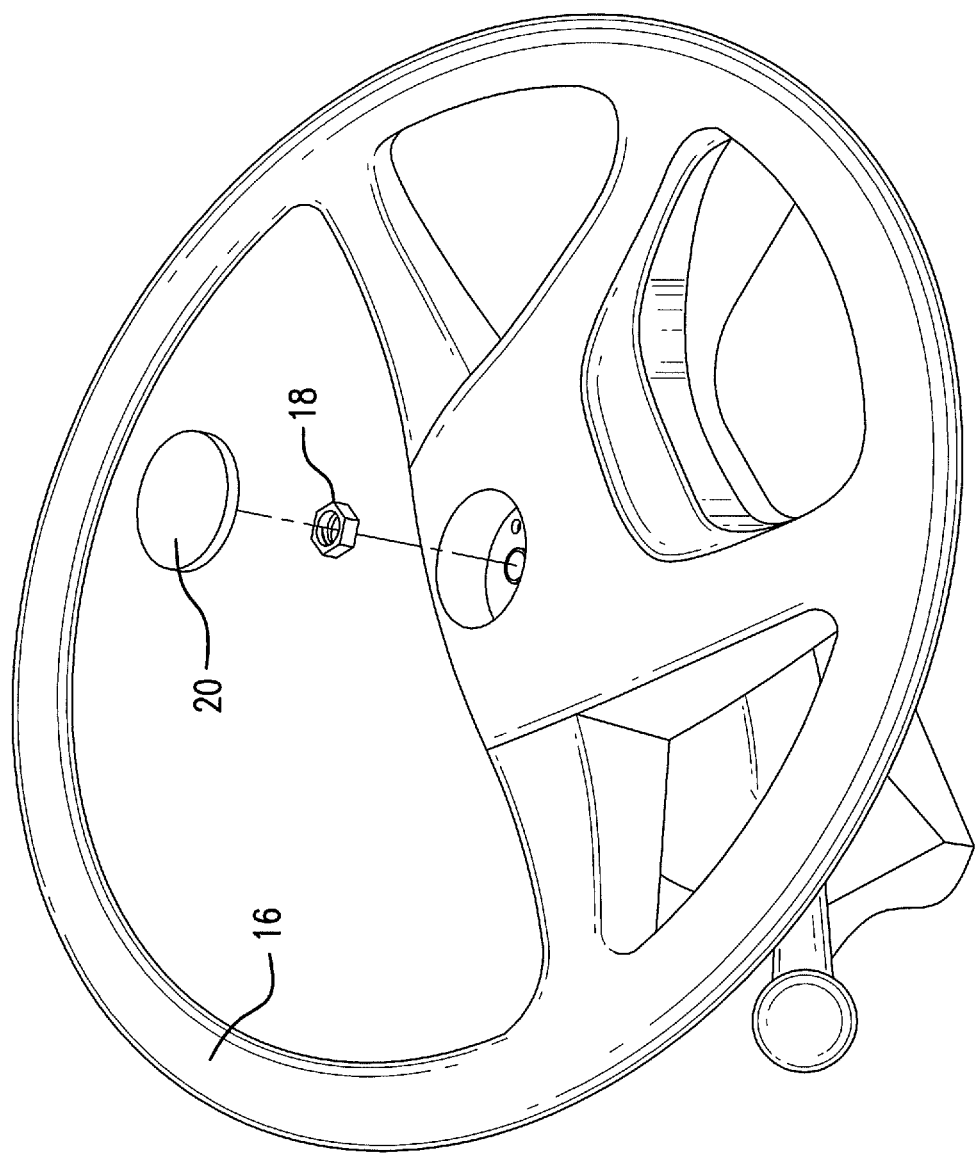
FIG. 1 is a perspective view of a steering wheel with a fastener exploded away from the steering column.

Commonly, the steering wheel 16 is mounted to the steering column with a fastener, such as a nut 18. FIG. 1. The fastener may be covered, such as by a button 20 that forms part of a horn switch. To remove the steering wheel, the fastener must be disengaged and removed from the steering wheel and steering column.

As shown in FIG. 2, the puller spacer is positioned over the steering column 30 after the fastener is removed. The horn wires 8 extend from the steering column, through the bottom of the body 2 of the puller spacer, into the center bore 6 of the puller spacer, and out of the slot 4 in the puller spacer. An additional cylindrical spacer may be positioned under the puller spacer if needed. The wires 8 extend through a center bore of the additional cylindrical spacer 22 and are received into the puller spacer as described.

Figure 3B:
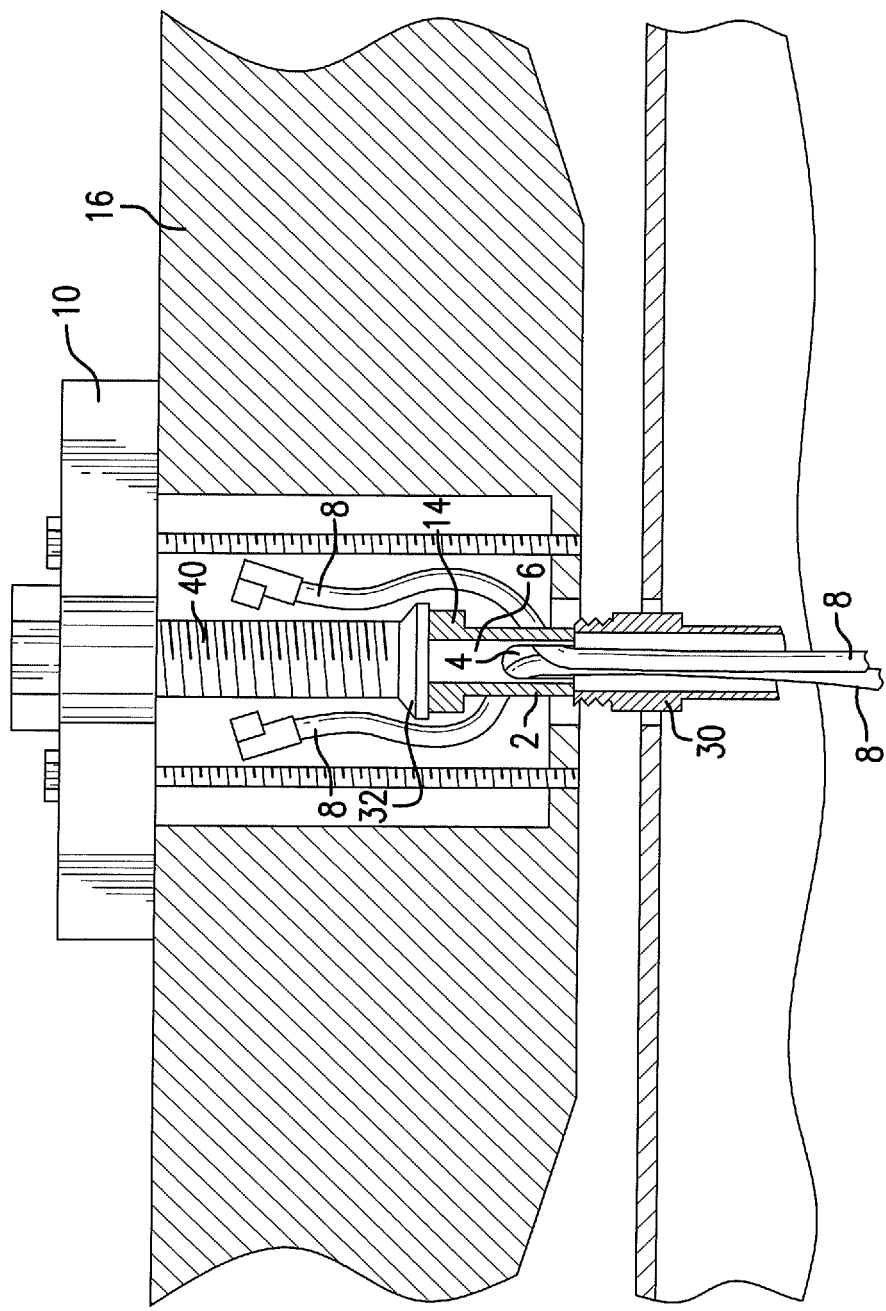
FIG. 3B is a sectioned view showing the progression from FIG. 3A as the center threaded member pushes against the puller spacer and the steering column to pull the steering wheel away from the steering column.

The steering wheel puller 10 is mounted to the steering wheel and shown in FIG. 3A. The steering wheel puller is characterized by two threaded members 26, such as cap screws, that engage threaded holes in the steering wheel 16. The threaded holes 28 are normally preexisting. The steering wheel puller has a center threaded member 40. The center threaded member of the steering wheel puller is positioned over the puller spacer as shown in FIG. 3A. In this Figure, the puller spacer directly engages the steering column 30, at the top of the steering column, with the conductive wires 8 for the horn extending into and out of the slot 4 of the puller spacer.

As the center threaded member 40 is rotated in a clockwise manner (for typical right hand threads) the center member pushes against the steering column 30, with the force transmitted by the puller spacer. The engagement of the two threaded members 26 with the steering wheel 16 causes the steering wheel to pull away from the frictional fit of the steering wheel to the steering column.

In the embodiment of the steering wheel puller as shown, a swivel 32 mounted to the bottom of the center threaded member 40 engages the shoulders 14 of the puller spacer. The center threaded member rotates relative to the swivel, which is constructed to not rotate as the center threaded member rotates. Therefore, the puller spacer, while transferring a force from the steering wheel puller to the steering column 30, is static as the steering wheel 16 is pulled away from the steering column. Since the puller spacer holding the conductive wires 8 for the horn is static, the conductive wires for the horn are also static. As the steering wheel is pulled away from the steering column (FIG. 3B) the conductive wires 8 for the horn are not subjected to a damaging force from rotation of the steering wheel puller or from having a force applied to the conductive wires by the steering wheel puller.

As shown in FIG. 4, the steering wheel 16 is separated from the steering column 30. The steering wheel puller and puller spacer are removed. Repair or replacement of the steering wheel or steering column may be accomplished.

Figure 5:
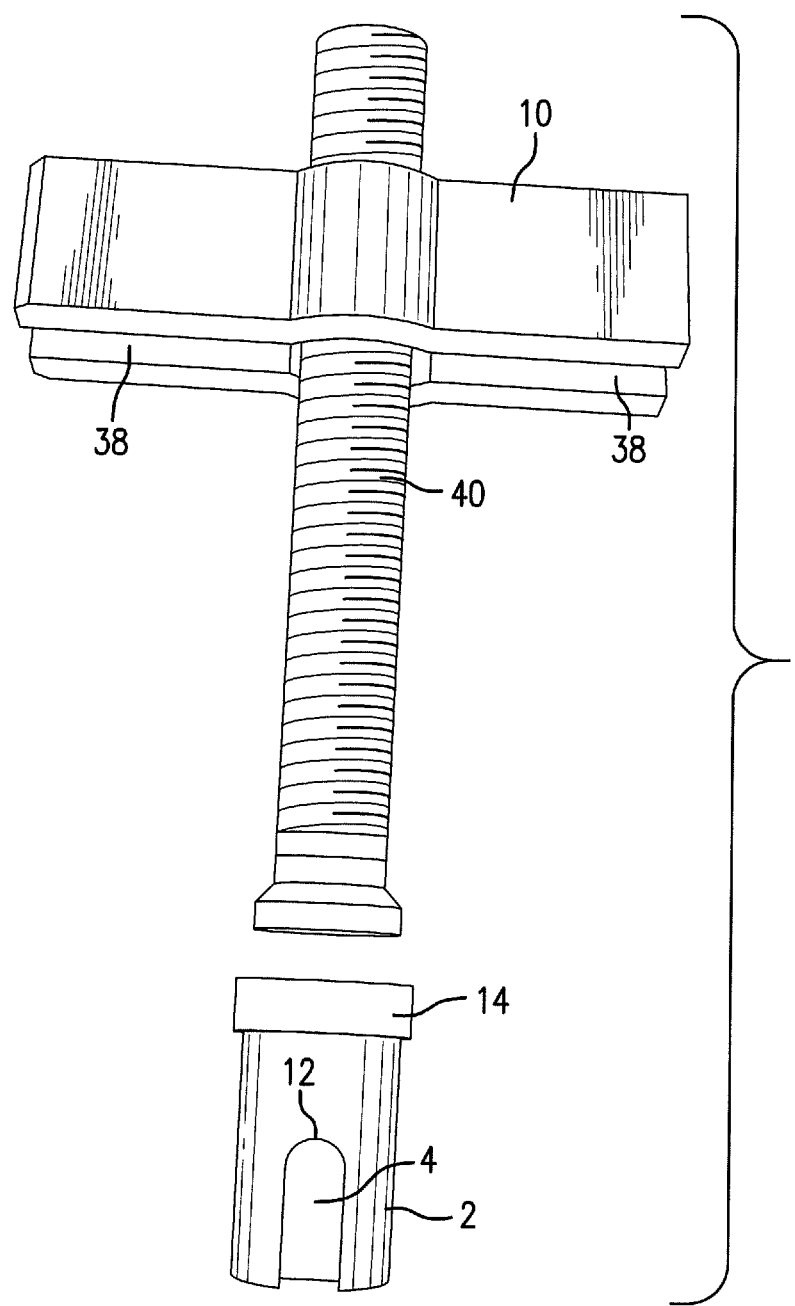
FIG. 5 shows an exemplary steering wheel puller and puller spacer.

An exemplary steering wheel puller is shown in FIG. 5. The swivel 32 is mounted to the bottom of the center threaded member. Slots 38 formed in the steering wheel puller allow threaded members, such as cap screws, of various lengths to be used according to the application, and spaced apart as required.

FIG. 6 is an enlarged view of the puller spacer demonstrating the conductive wires 8 for the horn entering the bottom opening of the center bore 6 of the body 2 and exiting the center bore through the slot 4 formed in the side of the body of the puller spacer.

A preferred diameter of the elongated and lower portion of the body 2 is about 2.25 centimeters. A preferred diameter of the enlarged shoulders 14 is about 2.5 centimeters. A diameter of the center bore 6 of the body may be from about 1.0 centimeters to about 1.2 centimeters. The overall length of the puller spacer may range from about 3.5 centimeters about 4.5 centimeters, with a more preferred length of about 3.8 centimeters. The enlarged shoulders may extend from the lower portion of the body at a height of about 0.6 centimeters to about 0.8 centimeters. The outside diameter of the enlarged shoulders may be knurled for gripping and positioning of the device.

The puller spacer is preferred to be constructed as a unitary member and formed of hardened steel or tool steel. The puller spacer may be chrome plated.

What is claimed:

1. The method of removing a steering wheel from a vehicle, comprising the steps of:
   a) removing a fastener from a steering column, wherein the fastener mounts a steering wheel to the steering column;
   b) positioning a pair of wires that extend out of a top of the steering column though a bottom of a puller spacer and into a center bore of the puller spacer, with an end of each of the wires extending out of a slot formed in a side of the puller spacer;
   c) positioning the puller spacer between a distal end of a center threaded member of a steering wheel puller and the top of the steering column, wherein the puller spacer comprises a cylindrical and elongated body having a diameter that does not exceed a diameter of the top of the steering column, and the elongated body of the puller spacer comprises the slot formed in a side thereof, wherein the slot extends from the center bore of the puller spacer to an exterior of the puller spacer;
   d) engaging the steering wheel puller with the steering wheel; and
   e) advancing the center threaded member of the steering wheel puller against the puller spacer to pull the steering wheel away from the steering column.

2. The method of removing a steering wheel from a vehicle of claim 1, wherein the bottom of the puller spacer is positioned against the top of the steering column and the pair of wires extend into the center bore of the puller spacer and out of the slot of the elongated body of the puller spacer when the distal end of the center threaded member is in contact with and is advanced against a top of the puller spacer.

3. The method of removing a steering wheel from a vehicle of claim 1, wherein the slot opens at the bottom of the puller spacer and extends along the side of the puller spacer for not less than fifty (50%) percent of the length of the puller spacer.

4. The method of removing a steering wheel from a vehicle of claim 1, wherein shoulders of the puller spacer formed on a top of the puller spacer and above the elongated body have a larger diameter than the diameter of the elongated body.

5. The method of removing a steering wheel from a vehicle of claim 1, wherein the center bore has sufficient diameter to accept two (2) 10 gauge wires therein and the slot has sufficient width and length to allow two (2) 10 gauge wires to pass through the slot from the center bore.

6. The method of removing a steering wheel from a vehicle of claim 1, wherein a top of the slot is arcuate in shape.

7. The method of removing a steering wheel from a vehicle of claim 1, wherein the center threaded member of the steering wheel puller has a swivel formed on a distal end thereof, and wherein the swivel engages a top of the puller spacer, and the swivel and puller spacer do not rotate as the center threaded member is advanced against the puller spacer.

8. The method of removing a steering wheel from a vehicle of claim 1, wherein an additional spacer having a center bore extending through the additional spacer is positioned between the steering column and the puller spacer, and wherein the pair of wires extends through center bore of the additional spacer and into the puller spacer.

9. The method of removing a steering wheel from a vehicle of claim 1, wherein the elongated portion of the body has a diameter of about 2.25 centimeters and the shoulders have a diameter of about 2.5 centimeters.

10. The method of removing a steering wheel from a vehicle of claim 1, wherein the elongated portion of the body has a diameter of about 2.25 centimeters and the shoulders have a diameter of about 2.5 centimeters, and the center bore of the body has a diameter from about 1.0 centimeters to about 1.2 centimeters and the overall length of the puller spacer is from about 3.5 centimeters to about 4.5 centimeters.

* * * * *